US012565794B2

(12) United States Patent
Bauriedl et al.

(10) Patent No.: US 12,565,794 B2
(45) Date of Patent: Mar. 3, 2026

(54) DOOR LATCH WITH SELF-HEALING

(71) Applicant: emz-Hanauer GmbH & Co. KGaA, Nabburg (DE)

(72) Inventors: Josef Bauriedl, Neunburg (DE); Georg Spiessl, Altendorf (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 226 days.

(21) Appl. No.: 18/346,985

(22) Filed: Jul. 5, 2023

(65) Prior Publication Data

US 2024/0011327 A1 Jan. 11, 2024

(30) Foreign Application Priority Data

Jul. 7, 2022 (DE) ..................... 10 2022 116 999.5

(51) Int. Cl.
*E05B 63/00* (2006.01)
*A47L 15/42* (2006.01)
(Continued)

(52) U.S. Cl.
CPC .......... *E05B 63/00* (2013.01); *A47L 15/4259* (2013.01); *E05B 9/02* (2013.01); *E05C 5/00* (2013.01); *E05B 2015/0413* (2013.01)

(58) Field of Classification Search
CPC ..... A47L 15/4259; D06F 39/14; D06F 37/42; D06F 34/20; E05B 2015/0413;
(Continued)

(56) References Cited

U.S. PATENT DOCUMENTS 1,147,921 A * 7/1915 Berry .................. E05B 47/0002 292/210
1,675,579 A * 7/1928 Seng ..................... E05C 19/024 292/DIG. 14
(Continued)

FOREIGN PATENT DOCUMENTS

CN 102481084 A * 5/2012 ......... A47L 15/0049
CN 110965871 A * 4/2020 ............. E05B 15/00
(Continued)

OTHER PUBLICATIONS

Official Action for Germany Patent Application No. 102022116999.5, dated Mar. 22, 2023, 4 pages.
Chinese Patent Appln 202310833055X—Office Action—Aug. 27, 2025.

*Primary Examiner* — Steven A Tullia
(74) *Attorney, Agent, or Firm* — Tarolli, Sundheim, Covell & Tummino LLP

(57) ABSTRACT

A domestic electrical appliance, for example a dishwasher, is disclosed, in which a door latch is installed in a profile strip of an appliance body. The door latch comprises a latch housing in which, in some embodiments, a rotary gripper and a leg-torsion spring serving as a closing spring are accommodated. In one embodiment, the door latch as a whole is displaceable in the profile strip in the strip longitudinal direction thereof in order to implement a self-healing function which allows the door to close even after the door latch has moved into a closed state without the door being closed. In another embodiment, a housing main part of the latch housing is mounted in a longitudinally fixed manner on the profile strip, but a housing cover of the latch housing is longitudinally displaceable relative to the housing main part, and the torsion spring and the rotary gripper are held on the housing cover.

19 Claims, 6 Drawing Sheets

(51) Int. Cl.
*E05B 9/02* (2006.01)
*E05B 15/04* (2006.01)
*E05C 5/00* (2006.01)

(58) Field of Classification Search
CPC .... E05B 2015/0406; E05B 9/02; E05B 63/00; E05B 15/00; E05B 15/0205; E05B 15/10; E05B 65/00; E05B 17/0025; E05C 5/00; E05C 5/02; E05C 19/024; E05C 19/02; E05C 2005/005; Y10T 292/0817; Y10T 292/0886; Y10T 292/0887; Y10T 292/0889; Y10T 292/089; Y10T 292/0893; Y10S 292/69
See application file for complete search history.

(56) References Cited

U.S. PATENT DOCUMENTS 3,722,937 A * 3/1973 Stoeckl .................... E05C 19/02 292/79
5,613,814 A * 3/1997 Jackson .................... B60P 7/13 410/70
7,032,936 B2 * 4/2006 Promutico .............. D06F 37/42 292/341.17
7,210,711 B2 * 5/2007 Dirnberger ................ E05C 3/24 292/68
9,107,560 B2 * 8/2015 Bauriedl ............. A47L 15/4259
9,487,976 B2 * 11/2016 Ala ...................... E05B 15/0086
9,567,783 B2 * 2/2017 Ala ........................ E05C 19/024
9,669,415 B2 * 6/2017 Le Guyader .............. B04B 9/08
9,924,850 B2 * 3/2018 Park .................... A47L 15/4225
9,995,067 B2 * 6/2018 Promutico .............. E05C 19/02
10,704,181 B2 * 7/2020 Lv ........................... D06F 23/04
10,920,362 B2 * 2/2021 Cho ........................ D06F 34/20
11,015,371 B2 * 5/2021 Schmidt .............. E05B 47/0004
11,272,826 B2 * 3/2022 Krieger .................... E05C 19/02
11,613,908 B2 * 3/2023 Tower .................. H05K 5/0221 292/66
11,739,575 B2 * 8/2023 Promutico .............. D06F 39/14 292/95
11,819,177 B2 * 11/2023 Chirumbolo .......... E05C 19/024
12,024,809 B2 * 7/2024 Wang ......................... E05C 3/24
12,091,891 B2 * 9/2024 Bauer ................. A47L 15/4259
12,096,901 B2 * 9/2024 Czekala .............. A47L 15/4259
2010/0314889 A1 * 12/2010 Wang .................... E05C 19/024 292/97
2012/0292924 A1 * 11/2012 Promutico .............. D06F 39/14 292/113
2018/0368652 A1 12/2018 Krieger et al.
2021/0238888 A1 * 8/2021 Promutico .............. D06F 37/42
2021/0363802 A1 11/2021 Promutico et al.
2022/0145665 A1 * 5/2022 Promutico .......... E05B 47/0012

FOREIGN PATENT DOCUMENTS

CN 113614434 A * 11/2021 ........... B25B 1/2405
DE 1073898 1/1960
DE 19504797 8/1996
DE 19537941 A1 * 4/1997 ......... E05B 17/2038
DE 19830900 A1 * 1/2000 ............. E05B 83/40
DE 10209480 A1 * 8/2003 ............. E05B 9/084
DE 102005052836 A1 * 5/2006 ............. E05B 83/24
DE 202012005738 U1 * 11/2013 ......... E05B 63/0056
DE 102016008044 1/2018
DE 102020124399 10/2021
EP 1304436 A2 * 4/2003 ............. D06F 39/14
EP 2479364 A1 * 7/2012 ......... A47L 15/4259
GB 264370 A * 1/1927 ........... E05C 19/024
GB 942906 A * 11/1963 ........... E05C 19/024
GB 2193525 A * 2/1988 ......... A47L 15/4259
KR 20090098715 A * 9/2009 ............. E05C 19/02
KR 20160051361 A * 5/2016 ............. E05C 19/02
LU 82271 A1 * 7/1980 ............. E05C 19/02
WO WO-2013114252 A1 * 8/2013 ......... A47L 15/4261

* cited by examiner

DOOR LATCH WITH SELF-HEALING

CROSS-REFERENCE TO RELATED APPLICATIONS

This application claims the benefit of German Patent Application No. 10 2022 116 999.5, filed Jul. 7, 2022, the entire contents of which are incorporated herein by reference in its entirety.

FIELD

The invention relates to a door latch for a domestic electrical appliance. The invention relates in particular to a door latch which provides a self-healing function.

BACKGROUND

Domestic electrical appliances such as, for example, washing machines, dishwashers, tumble dryers, washer-dryers (i.e. combination appliances with a washing and drying function for laundry), microwave ovens, etc. are usually equipped with a door latch which allows a door, by means of which a working chamber of the domestic appliance can be closed, to be held closed. The door latch is conventionally adjustable into two stable states, an open state and a closed state. In the closed state, the door latch can securely hold a counter-member which, on closing of the door, approaches and enters the door latch, and in the open state the counter-member is able to leave the door latch. Conventional door latches comprise a closing spring assembly which is formed by one or more spring elements and which, when the door is closed, that is to say when the door latch is in its closed state, provide resistance to opening of the door. This so-called holding-closed force of the door latch must be overcome by the user when he pulls the door by hand in order to open the door.

For the prior art relating to door latches for domestic electrical appliances, reference may be made, for example, to DE 10 2016 008 044 B4, US 2015/0238065 A1, DE 10 2020 122 689 B3, DE 195 04 797 C2, DE 10 2020 124 399 B3, DE 10 2010 051 518 A1 and DE 198 37 248 A1.

As a result of manipulation, for example by a child who is playing, it can be that the door latch, intentionally or unintentionally, changes from the open state into the closed state without an attempt having been made to close the door. It is easily understandable that it would be a considerable inconvenience for the user if, every time this happened, he had to call a service engineer who, for a fee, carries out the necessary work to return the door latch to a state in which it is ready for use again (i.e. open state of the door latch when the door is open).

For this reason, door latches have been developed in the prior art which have a so-called self-healing function, which allows the door to be closed even though the door latch is already in its closed state. Therefore, even if the door latch accidentally moves into the closed state when the door is still open, the user can close the door properly by manually pushing it shut and can bring the counter-member into proper closing engagement with the door latch. In this self-closing operation, a yielding movement of one or more components within the door latch usually occurs when the counter-member enters the door latch as a result of the attempt at closing the door. This yielding movement allows the counter-member to reach its intended position within the door latch and to be captured therein in the intended manner.

The documents DE 10 2016 008 044 B4, US 2015/0238065 A1, DE 10 2020 122 689 B3, DE 195 04 797 C2 and DE 10 2020 124 399 B3 which have already been mentioned show examples of conventional door latches which have a self-healing function.

The constructions disclosed in the last-mentioned documents are, however, not or not readily transferrable to a latch type as is disclosed in DE 198 37 248 A1 and DE 10 2010 051 518 A1. In those documents, the latch contains a rotary gripper which is arranged so as to be rotatable between an open rotational position and a closed rotational position and which, on rotation from the open rotational position into the closed rotational position, bears with a peripheral portion located radially further outwards against an abutment surface formed by a latch housing. On reaching the closed rotational position, the peripheral portion of the rotary gripper located radially further outwards loses contact with the abutment surface, so that a closing spring is suddenly able to relax and the rotary gripper performs a translational pulling-shut movement by means of which the door is pulled shut with compression of a door seal. In conventional door latches, the pulling-shut movement ends when a peripheral portion of the rotary gripper located radially further inwards strikes the abutment surface under the action of the relaxing closing spring. In latches of this type, the rotational movement of the rotary gripper is largely or even completely separate from the translational pulling-shut movement. This makes it possible, with a comparatively low closing force to be applied by the user to close the door, to ensure a comparatively high pulling-shut force generated by the latch.

SUMMARY

It is an object of the invention to show a way in which, even in a door latch which ensures a comparatively high pulling-shut force with at the same time a comparatively low closing force, a reliable self-healing function can be achieved in a structurally simple manner.

In order to achieve this object, the invention provides, according to a first aspect, a door latch for a domestic electrical appliance, comprising: a closing spring assembly; a gripper which is arranged so as to be movable between an open position and a closed position and which, in the open position, is urged by the closing spring assembly into supporting contact with an abutment structure, preventing relaxation of the closing spring assembly, wherein the gripper has a gripping mouth delimited by two jaws for holding captive a closing member which, on closing of the door, approaches the rotary gripper along a closing path, wherein, on closing of the door, the closing member, in the open position of the gripper, strikes a first of the jaws and in so doing initiates a movement of the gripper into the closed position, wherein the movement of the gripper comprises a first part-movement starting from the open position and a subsequent second part-movement into the closed position, wherein the first part-movement comprises a rotational movement of the gripper (without or without substantial relaxation of the closing spring assembly) until the gripper loses supporting contact with the abutment structure (for a short time or—because the gripper bears against another structure in the closed position—permanently), wherein during the first part-movement the second of the jaws engages behind the closing member and in so doing captures the closing member in the gripping mouth, wherein the second part-movement comprises a translational movement of the gripper along the closing path with relaxation of the closing spring assembly. According to the invention, it is provided in such a door latch that the gripper and the abutment structure, in the closed position of the gripper, are arranged for a joint, in particular linear, yielding movement transverse to the closing path into a yielding position, in order to allow the door to close in the closed position.

According to some embodiments, the closing spring assembly is also arranged for the joint yielding movement with the gripper and the abutment structure.

According to some embodiments, the gripper and the abutment structure and if desired also the closing spring assembly are arranged on a common carrier which is movably arranged to carry out the yielding movement. The door latch here comprises a return spring, separate from the closing spring assembly, for returning the carrier from the yielding position.

In some embodiments, the door latch comprises a latch housing in which the gripper and the closing spring assembly are accommodated. The latch housing comprises a housing main part and a cover part for closing the housing main part. In such embodiments, either the carrier can be formed by the cover part, in which case the cover part is then arranged so as to be movable relative to the housing main part in order to carry out the yielding movement. Or the carrier is formed by the housing main part, in which case the latch housing is then intended and configured to be arranged so as to be movable relative to a superordinate component of the domestic appliance, for example relative to a profile strip as part of a stiffening structure of an appliance body of the domestic appliance on which the door is pivotably mounted, in such a manner that the yielding movement is made possible by the relative movability between the latch housing and the superordinate component.

Some embodiments provide that the closing spring assembly comprises a torsion spring, which is formed by a spring wire coil having two spring legs protruding in particular tangentially therefrom. The torsion spring is arranged with its coil axis substantially perpendicular to a rotational plane of the gripper, and one of the spring legs is coupled with the gripper. Within the scope of the present disclosure, the configuration of the closing spring assembly with such a torsion spring is independent of whether the gripper and the abutment structure are arranged for a joint self-healing yielding movement. The torsion spring allows comparatively high spring forces to be generated with a compact construction without the risk of buckling as is occasionally to be observed, for example, in the case of helical compression springs.

For a high force action of the torsion spring on the gripper during the second part-movement thereof, an arrangement of the torsion spring can be chosen in which, in the closed position of the gripper—when seen perpendicular to the rotational plane thereof—the spring leg of the torsion spring that is coupled with the gripper is oriented substantially perpendicular to the direction of the closing path. Such an arrangement of the torsion spring can make possible a high holding-closed force of the door latch. However, it can also result in a self-healing possibility being difficult to implement, if it was intended to provide for this purpose play for movability of the gripper relative to the support point of the other spring leg of the torsion spring. If, however, the gripper and the torsion spring (and if desired also the abutment structure) are arranged on a common carrier against which that other spring leg of the torsion spring then also bears, and if the carrier is arranged with yielding movability transverse to the closing path, a self-healing possibility of the door latch can be implemented without any problem.

According to some embodiments, the gripper is designed with an elongate hole into which a bearing member arranged stationarily relative to the abutment structure engages with play for movability in the hole longitudinal direction, wherein, in the closed position of the gripper, the elongate hole runs with its hole longitudinal direction substantially along the closing path. The elongate hole in the gripper permits translational motion of the gripper during the second part-movement thereof. It can be provided regardless of whether the closing spring assembly comprises a torsion spring and whether the gripper and the abutment structure are arranged for the joint yielding movement. The bearing member can be formed, for example, by a roller mounted on an anti-friction bearing. This can make possible low-friction rotation of the gripper during the first part-movement.

It should be pointed out that the first part-movement of the gripper does not have to consist solely of a rotational movement of the gripper. Instead, the first part-movement can comprise, in addition to the rotational movement, a certain translational movement of the gripper, although the extent of any such translational movement during the first part-movement of the gripper is smaller, in particular considerably smaller, at least in some embodiments than the translational movement of the gripper in the second part-movement. Similarly, it is equally possible that the second part-movement of the gripper involves a certain rotational movement of the gripper, although the extent of any such rotational movement of the gripper during the second part-movement is smaller, in particular considerably smaller, at least in some embodiments than the rotational movement of the gripper in the first part-movement.

According to a further aspect, the invention provides a domestic electrical appliance, in particular a dishwasher, comprising: a body having a working chamber formed therein; a door for closing the working chamber, which door is pivotably mounted on the body and carries a closing member; and a door latch installed in a body wall, in particular a roof wall, of the body, wherein the door latch comprises a closing spring assembly and a gripper which is arranged so as to be movable between an open position and a closed position, wherein the gripper has a gripping mouth delimited by two jaws for holding captive a closing member which, on closing of the door, approaches the rotary gripper along a closing path, wherein, on closing of the door, the closing member, in the open position of the gripper, strikes a first of the jaws and in so doing initiates a movement of the gripper into the closed position, wherein the movement of the gripper from the open position into the closed position comprises a rotational movement of the gripper in which the second of the jaws engages behind the closing member and in so doing captures the closing member in the gripping mouth, wherein the closing spring assembly, in the closed position of the gripper, acts against a return movement of the gripper in the direction towards the open position, wherein the door latch further comprises a latch housing in which the gripper and the closing spring assembly are accommodated, wherein the gripper and the closing spring assembly are arranged on a common carrier which is movably arranged so as to carry out a yielding movement, in particular a linear yielding movement, relative to the body wall, wherein the yielding movement of the carrier comprises a corresponding joint yielding movement of the gripper and of the closing spring assembly transverse to the closing path in order to allow the door to be closed when the gripper is in the closed position.

Again, the joint yielding movement of the gripper and of the closing spring assembly is an operation in which the gripper and the closing spring assembly together with the carrier as a whole move in a direction transverse to the closing path in order thus to permit self-healing of the door latch.

In general, the domestic appliance can be of many different kinds and, as an alternative to a dishwasher, can be formed, for example, by a laundry treatment machine (only for washing, only for drying, or for combined washing and drying). Some domestic appliances, in particular dishwashers, often have a design in which the body comprises, in the body wall in which the door latch is installed, a profile strip which extends at least over part of the width of the body wall and in particular substantially over the entire wall width, on which profile strip the door latch is mounted. Such a profile strip, which is, for example, approximately U-shaped in cross-section, often serves for the purpose of stiffening and can be part of a reinforcing frame which extends at least partially around an access opening, formed in the body, to the working chamber. In the case of domestic appliances having such a profile strip (which can also be referred to as a profile rail or reinforcing strip), the door latch can be mounted stably and securely in position by fastening the door latch to the profile strip.

In this respect, the invention provides two alternative embodiments, both of which ensure the joint yielding movement of the gripper and of the closing spring assembly for the purpose of self-healing of the door latch. According to one possible embodiment, the latch housing comprises a housing part which in particular can form a main housing part and is designed with mounting structures for mounting on the profile strip. The common carrier for the gripper and the closing spring assembly can in this case be formed by the housing part that is designed with the mounting structures, wherein the housing part has play for movability in the strip longitudinal direction relative to the profile strip, which ensures the yielding movement. According to some embodiments, at least one mounting channel is formed in the profile strip, into which mounting channel the housing part is inserted with play for movability in the strip longitudinal direction. A support structure for a return spring can additionally be provided on the profile strip, which return spring bears on the other side against the housing part and biases it in the direction towards a rest position, from which the housing part (together with the gripper and the closing spring assembly), when self-healing is attempted, is able to yield against the action of the return spring into a yielding position.

According to another possible embodiment, the latch housing comprises a first housing part, which again can form a housing main part and is designed with mounting structures for mounting on the profile strip. The latch housing further comprises a second housing part, formed separately from the first housing part, which can serve, for example, as a housing cover for the latch housing. The common carrier for the gripper and the closing spring assembly is formed in this embodiment by the second housing part, wherein the second housing part has play for movability in the strip longitudinal direction relative to the first housing part, which ensures the yielding movement.

Accordingly, in both possible embodiments, one housing component of the latch housing serves as the carrier for the gripper and the closing spring assembly. In a variant, the latch housing as a whole is movable relative to the profile strip, while in another variant, only a component of the latch housing that does not serve for mounting of the latch housing on the profile strip is movable relative to the profile strip.

According to some embodiments, the gripper is installed in the body wall with its rotational plane parallel to the wall plane of the body wall.

BRIEF DESCRIPTION OF THE DRAWINGS

The invention will be explained further hereinbelow with reference to the accompanying drawings, in which.

DETAILED DESCRIPTION

Figure 1:
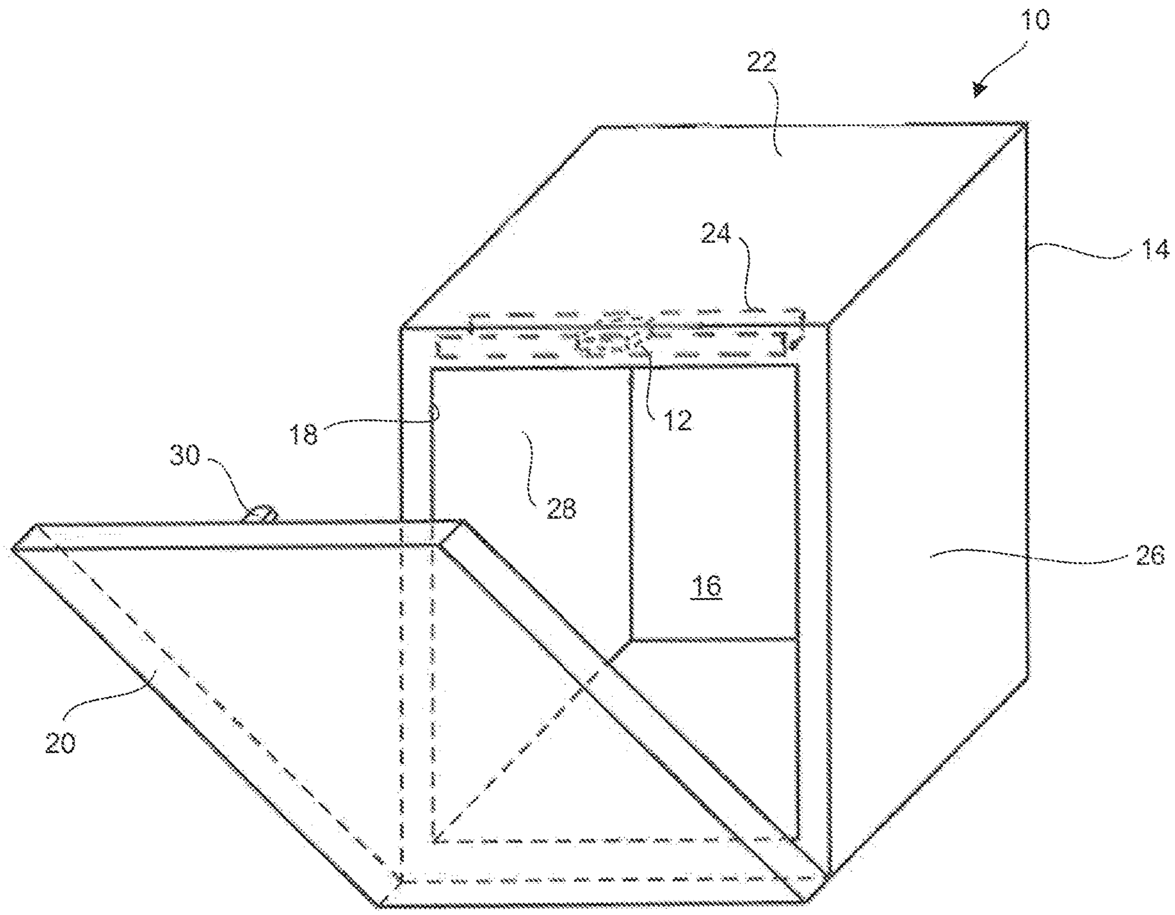
FIG. 1 shows, schematically, a domestic dishwasher according to an exemplary embodiment.

Reference will first be made to FIG. 1. The dishwasher shown therein, which is intended for use in a private household, is generally designated 10. It is an example of a domestic appliance in which a door latch 12 according to the invention can be used. The dishwasher 10 comprises a dishwashing container (body) 14 having a dishwashing chamber (working chamber) 16 formed therein, which is accessible for a user through a front access opening 18. The access opening can be closed by a door 20 which is mounted in the foot region of the dishwashing container 14 so as to be pivotable about a horizontal pivot axis (not shown in detail).

The door latch 12 is installed in the container roof (body roof), designated 22, of the dishwashing container 12. In the container roof 22 there is at the front, that is to say adjacent to the access opening 18, a profile strip or profile rail (generally: reinforcing strip) 24, which extends substantially over the entire front width of the container roof 22 and serves as a stiffening structural element of the container roof 22. There may also be a stiffening bar (not shown here) in the front wall region of each of the opposite side walls of the dishwashing container 14—designated 26, 28 in FIG. 1. The horizontally extending profile strip 24 of the container roof 22, together with such lateral, vertically extending stiffening bars of the side walls 26, 28, can form a front reinforcing frame of the dishwashing container 14 or be part of such a reinforcing frame. In the example shown, the profile strip 24 is in the form of a U-shaped profile strip which is open at the top. Such a U-shaped form and such an installation position of the profile strip 24 are also taken as the starting point in the following figures. It will be appreciated, however, that other profile cross-sections of the profile strip 24 and also other installation positions are readily conceivable.

Arranged on the door 20 is a closing member 30 which, on closing of the door 20, enters the door latch 12 and is captured therein. When the door 20 is closed properly, the door latch 12 provides resistance, based on spring force, to opening of the door 20—the so-called holding-closed force. This must be overcome by a user pulling on the door 20 in order to be able to open the door 20.

Figure 2:
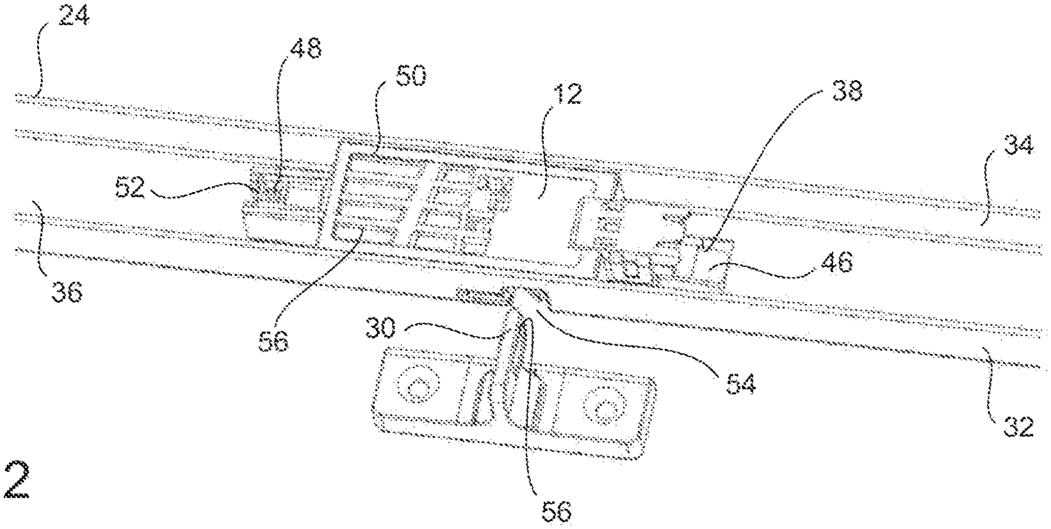
FIG. 2 shows, in perspective, a door latch according to an exemplary embodiment which is installed in a profile strip and is suitable for use in the dishwasher of FIG. 1.
Figure 3A:
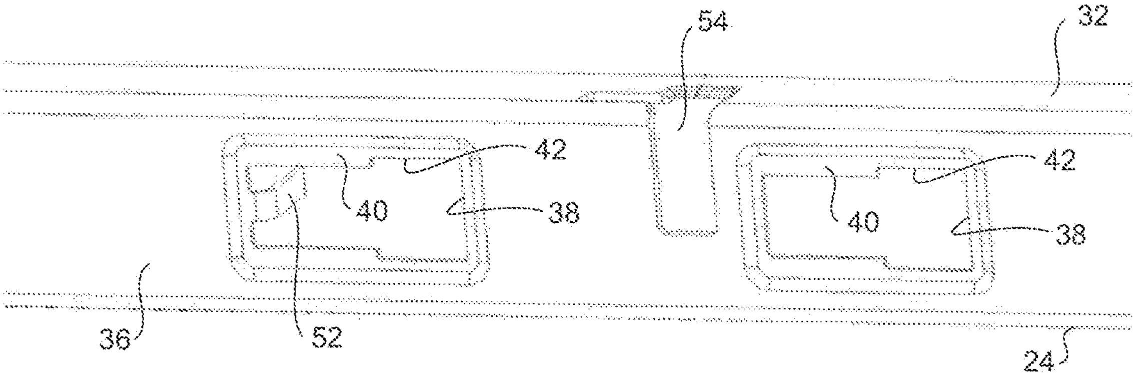
FIG. 3*a* shows the profile strip of FIG. 2 in a perspective view obliquely from beneath.
Figure 3B:
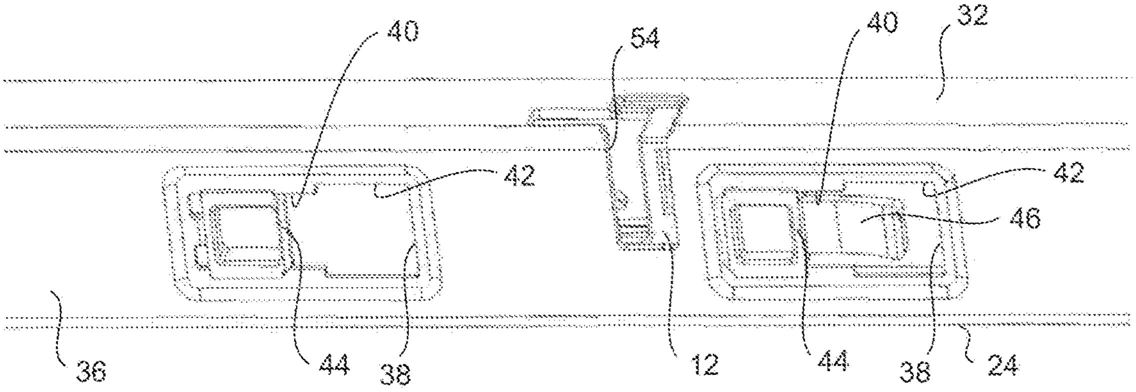
FIG. 3*b* shows the profile strip of FIG. 3*a* in the same perspective view but after the door latch of FIG. 2 has been installed in the profile strip and after the door latch has been displaced into a yielding position.

Reference will next be made to FIGS. 2, 3*a* and 3*b*. In the exemplary embodiment shown in these figures, the door latch 12 is inserted into the interior space, delimited between the two lateral strip walls—designated 32, 34—of the U-shaped profile strip 24 and held on the strip base—designated 36—of the U-shaped profile strip 24. In the strip base 36, the profile strip 24 has at least one and in the example shown two mounting channels 38, which serve for attaching the door latch 12 to the profile strip 24. The mounting channels 38 serve to hold the door latch 12 so that it is longitudinally displaceable (i.e. displaceable in the strip longitudinal direction) and form openings in the strip material of the profile strip 24. They each have a narrower channel region 40 and, adjacent thereto in the strip longitudinal direction, a wider channel region 42. On the underside of the door latch 12 (based on its installed position in the dishwasher 10) there is formed, in association with each of the mounting channels 38, a mounting foot 44, which is guided on the opposite channel edges of the narrower channel region 40 so as to be displaceable in the strip longitudinal direction. Guiding the door latch 12 on the channel edges of the mounting channels 38 ensures a secure hold both in the vertical direction (i.e. orthogonal to the strip base 36) and in the horizontal-lateral direction (i.e. transverse to the strip longitudinal direction).

For mounting the door latch 12 on the profile strip 14, the mounting feet 44 are first inserted into the wider channel regions 42 of the mounting channels 38. The latch 12 is then displaced relative to the profile strip 14 in the strip longitudinal direction until the mounting feet 44 come into guiding engagement with the channel edges of the narrower channel regions 40. As the mounting feet 44 are pushed forward into the narrower channel regions 40, a resilient locking tab 46 formed on the door latch 12 snaps into the wider channel region 42 of one of the mounting channels 38 and prevents the mounting feet 44 from moving back into the wider channel regions 42. The latch 12 is thus held captively on the profile strip 24 despite having play for movability in the strip longitudinal direction.

FIG. 2 shows the latch 12 in a starting or rest position relative to the profile strip 24. The door latch 12 is biased into this position by a return spring 48, which bears on the one hand against a latch housing 50 of the door latch 12 and on the other hand against a support plate 52 which is arranged stationarily relative to the profile strip 24. In the rest position according to FIG. 2, the locking tab 46 is located directly in front of the rear channel edge of the wider channel region 42 of one of the mounting channels 38. In FIG. 3*b*, on the other hand, the door latch 12 is shown in a yielding position, in which the door latch 12 has been displaced relative to the profile strip 24 against the action of the return spring 48 in the direction towards the front channel end of the mounting channels 38; in the yielding position, the locking tab 46 is at a certain longitudinal distance from the rear channel edge of the mounting channel 38 in question. The yielding position according to FIG. 3*b* permits self-healing of the door latch 12, that is to say closing of the door 20 following a preceding (generally unintentional) change of the door latch 12 from an open state into a closed state without the door 20 hereby being closed.

The mounting channels 38 with their narrower and wider channel regions 40, 42 can be formed by separate plastics insert elements which are inserted into larger openings, produced, for example, by punching, in the metallic base material of the profile strip 24. One of these insert elements can additionally form the support plate 52. Alternatively, it is conceivable to omit such additional insert elements and instead form the channel edges of the mounting channels 38 and also the support plate 52 directly from the metal material of the profile strip 24.

A cutout 54 in the profile strip 24 additionally allows the closing shackle 30 to enter the interior of the profile strip 24 and thus the operative region of the door latch 12. In the example shown, the closing shackle 30 has a shackle cross-piece 56 which is oriented substantially vertically when the door 20 is upright and which, on closing of the door 20, is engaged from behind and held securely by a rotary gripper located in the door latch 12. As an alternative to the closing shackle 30 shown, it is conceivable that the door 20 carries a closing pin, which is correspondingly likewise oriented substantially vertically when the door 20 is upright. The precise configuration of the closing member attached to the door 20 (whether as a closing shackle 30, whether as a closing pin or whether as another design) is not important for the present invention. The only important factor is that a suitable closing member which, on closing of the door 20, can be gripped and held securely by the door latch 12 is arranged on the door 20.

Figure 4A:
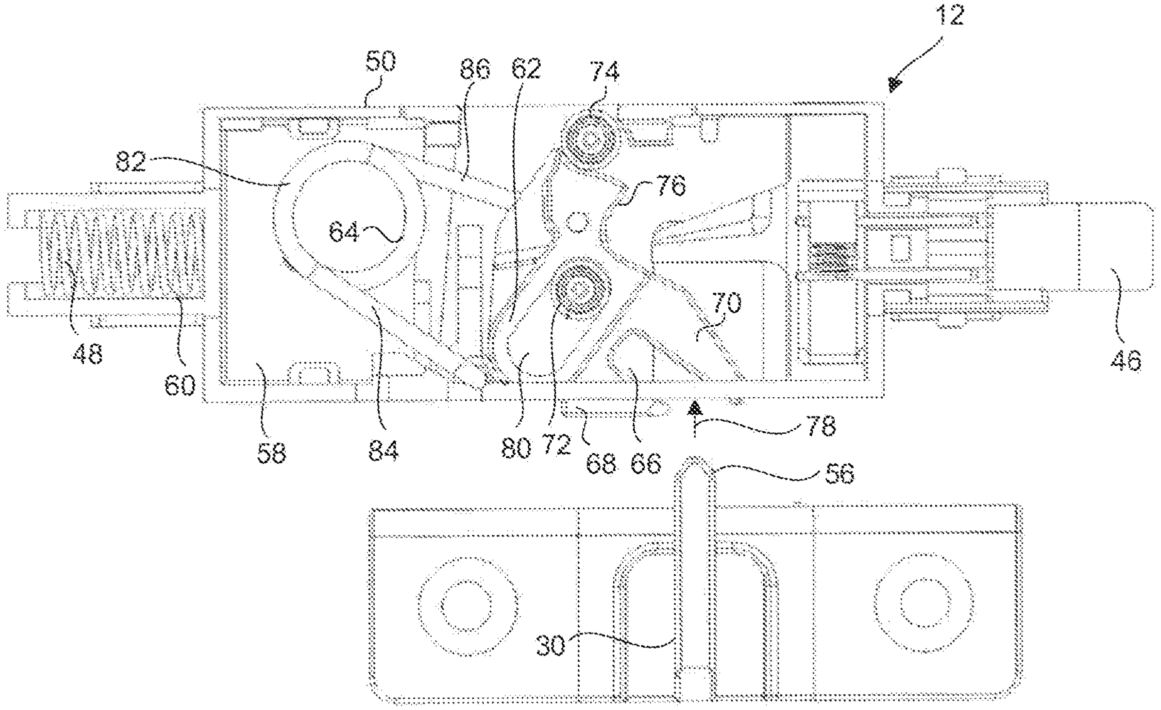
FIG. 4*a* shows an inside view of the door latch of FIG. 2 (after removal of a housing cover) in an open state, before a closing shackle mounted on the door enters the door latch.
Figure 4B:
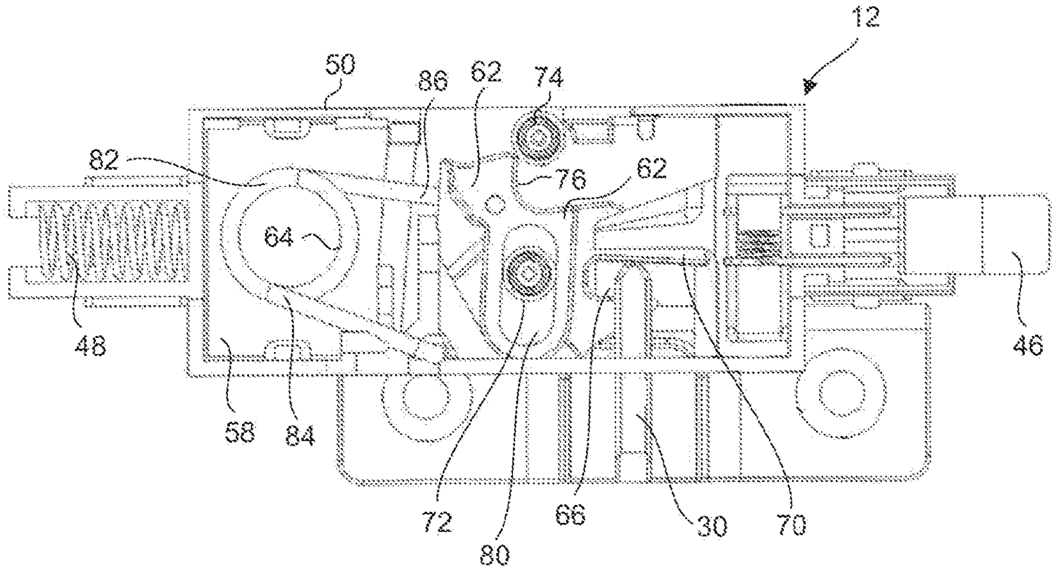
FIG. 4*b* shows a view of the door latch of FIG. 4*a* in an intermediate state, after the closing shackle has entered the door latch but the door latch has not yet reached its final closed state.

For further details of the door latch 12, reference will now be made to FIGS. 4*a* to 4*c*. In those figures, the profile strip 24 has been omitted for the sake of clarity. FIG. 4*a* shows the door latch in the mentioned open state which it occupies as long as the door 20 has not yet been closed and as long as the door latch 12 has not been transferred by other, intentional or unintentional, manipulation into the closed state without closing the door 20. The inside view, visible in FIGS. 4*a* to 4*c*, of the door latch 12 results from the omission of a housing cover 56 (FIG. 2), which together with a housing main part 58 forms the latch housing 50 and can be fitted to and fastened on the housing main part 58 in order to close the latch housing 50. The housing main part 58 is designed with the mounting feet 44 and the locking tab 46 and forms a spring chamber 60 for accommodating the return spring 48.

Space is additionally provided in the housing main part 58 for accommodating and holding a rotary gripper 62 and a torsion spring 64, which serves as the closing spring and generates the holding-closed force which has been explained. The rotary gripper 62 has a gripping mouth 66, which is delimited by a front jaw 68 and a rear jaw 70 and in which, when the door 20 is closed, the shackle crosspiece 56 of the closing shackle 30 is captured. In the open state of the door latch 12 according to FIG. 4*a*, the rotary gripper 62 is in an open position, in which the shackle crosspiece 56 is able to enter the gripping mouth 66 on closing of the door 20. On closing of the door 20, the shackle crosspiece 56 strikes the rear jaw 70 and in so doing sets the rotary gripper 62 in rotation about a centre of rotation which is stationary relative to the latch housing 50, more specifically relative to the housing main part 58, and which is formed in the example shown by a bearing roller 72. The rotational axis of the rotary gripper 62 runs perpendicular to the container roof 22; in other words, the rotational plane of the rotary gripper 62 is parallel to the roof plane of the container roof 22. This makes for a small installation height of the door latch 12. In the course of the rotation of the rotary gripper 62, the front jaw 68 moves behind the shackle crosspiece 56, see FIG. 4*b*, whereby the shackle crosspiece 56 is captured in the gripping mouth 66.

The torsion spring 64 biases the rotary gripper 62 in the open position according to FIG. 4*a* against an abutment structure which is stationary relative to the housing main part 58 and which is formed in the example shown by an abutment roller 74. Both rollers, that is to say the bearing roller 72 and the abutment roller 74, can be mounted on anti-friction bearings for low rolling friction. In the open position according to FIG. 4*a*, the rotary gripper 62 bears with a region of its periphery located radially further outwards against the abutment roller 74. After rotation through an angular distance which is sufficient to move the front jaw 68 behind the shackle crosspiece 56 and thus capture the closing shackle 30, a radial recess, defined by a radial sliding edge 76, of the rotary gripper 62 reaches the region of the abutment roller 74. This situation is shown in FIG. 4*b*. The recess in the rotary gripper 62 allows the rotary gripper to perform, in the rotational plane, under the action of the torsion spring 64, a translational movement substantially along the closing path which the closing shackle 30 follows on entering the door latch 12. This closing path is indicated in FIG. 4*a* by an arrow 78. Although the door 20 is pivotably mounted on the dishwashing container 14, the path covered by the closing shackle 30, at least in the comparatively short section which it covers in the door latch 12, can be regarded in good approximation as a straight line. The mentioned translational movement of the rotary gripper 62 is made possible in the example shown by an elongate hole 80 formed in the rotary gripper 62 and has the effect of pulling the door 20 shut. At the end of the translational movement, the rotary gripper 62 reaches its closed position according to FIG. 4*c* (corresponding to the closed state of the door latch 12). The translation stroke is defined by the length of the elongate hole 80 or/and the radial depth of the radial recess formed by the sliding edge 76.

The torsion spring 64 is supported between the housing main part 58 and the rotary gripper 62. In the example shown, it is in the form of a leg spring with two spring legs 84, 86 protruding tangentially from a spring wire coil 82, of which one spring leg (here the spring leg 84) is coupled in a force-transmitting manner with the housing main part 58 and the other spring leg (here the spring leg 86) is coupled in a force-transmitting manner with the rotary gripper 62. In the example shown, the spring legs 84, 86 have a leg angle of more than 90° and less than 180°. It will be appreciated that this leg angle is not limiting. The coil axis, indicated at 88 in FIG. 4*c* and running perpendicular to the plane of the drawing of FIG. 4*c*, of the spring wire coil 82 runs substantially parallel to the rotational axis of the rotary gripper 62 and consequently substantially orthogonal to the roof plane of the container roof 22.

Figure 4C:
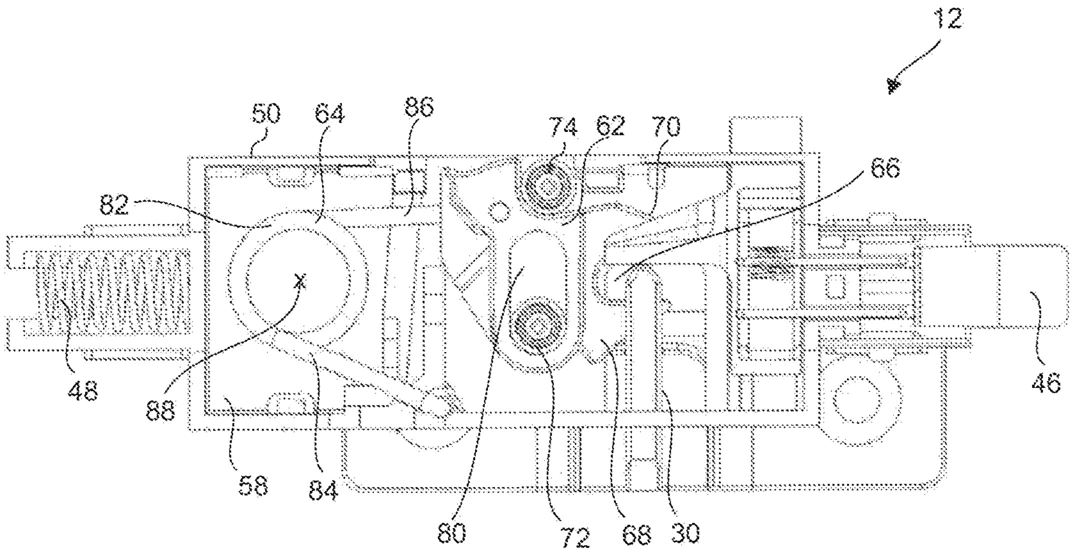
FIG. 4*c* shows the door latch of FIG. 4*b* after it has reached the closed state.

It can be seen in FIG. 4*c* that, in the closed position of the gripper 62, the spring leg 86 coupled therewith is oriented approximately perpendicular to the direction of the closing path 78 and that therefore, in this state of the door latch 12 (i.e. the closed state), only a force directed substantially along the closing path 78 is exerted by the torsion spring 64 on the gripper 62. In the closed state, this force urges the gripper 62 against the abutment roller 74 or/and the bearing roller 72 and corresponds to the holding-closed force which must be overcome to open the door 20. By contrast, a force component perpendicular to the direction of the closing path 78 in the rotational plane of the rotary gripper 62—if such a force acts on the rotary gripper 62 at all in the closed state of the door latch 12—is at most very small. Therefore, the torsion spring 64 is not suitable in the relative installation position shown for exerting the return force required in a self-healing operation on the rotary gripper 62. The orientation of the spring leg 86 substantially perpendicular to the direction of the closing path 78 in the closed state of the latch is, on the other hand, advantageous for as great a pulling-shut force of the door latch 12 as possible.

Figure 5A:
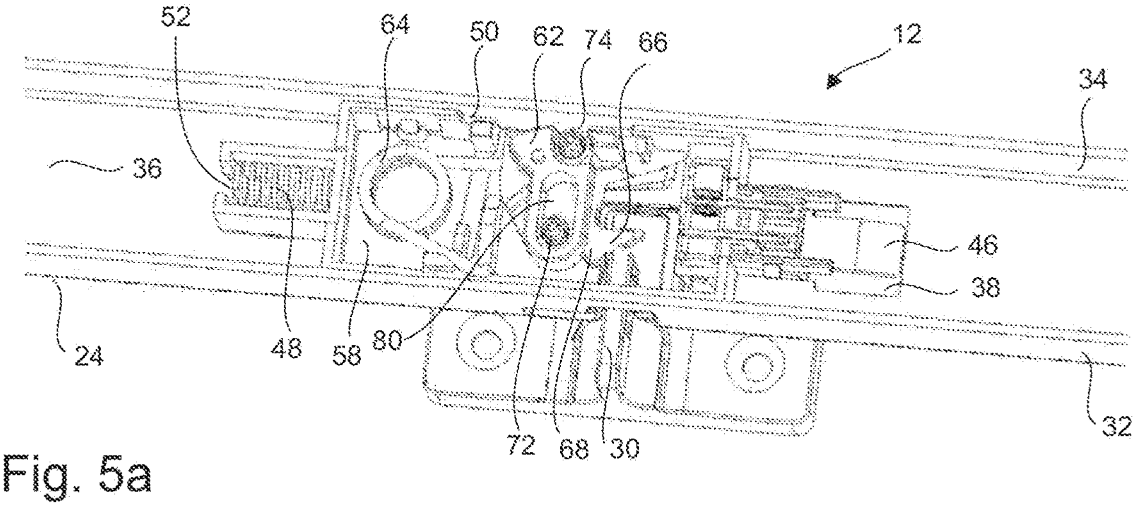
FIG. 5*a* shows, in perspective, an inside view of the door latch of FIG. 2 in a first phase of a self-healing operation.
Figure 5B:
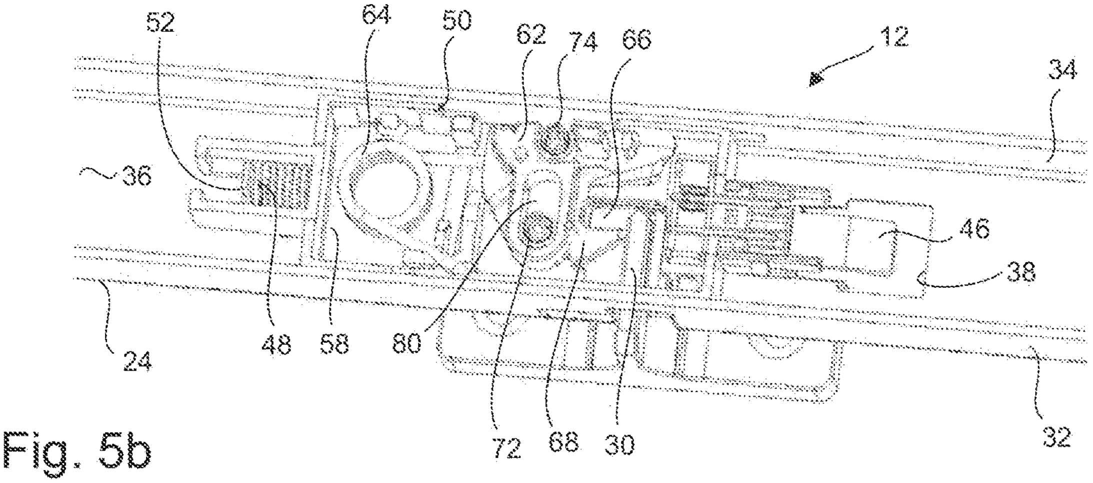
FIG. 5*b* shows a view corresponding to FIG. 5*a* but in a subsequent second phase of the self-healing operation.
Figure 6:
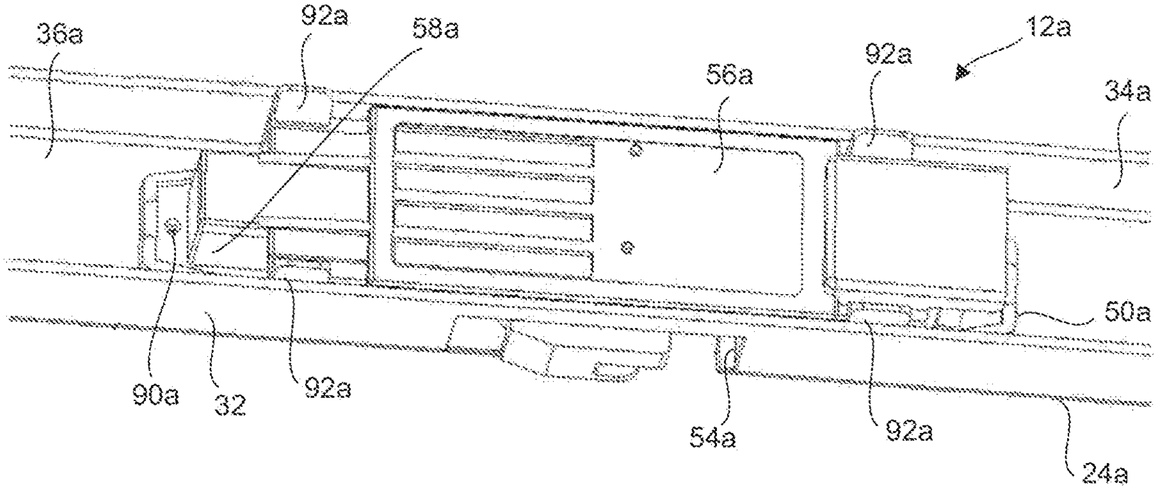
FIG. 6 shows, in perspective, a door latch according to a further exemplary embodiment which is installed in a profile strip and is suitable for use in the dishwasher of FIG. 1.
Figure 7A:
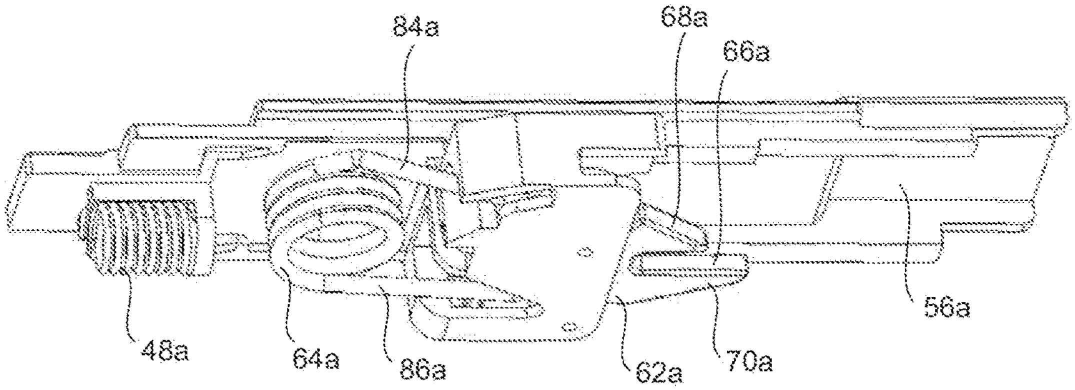
FIG. 7*a* shows, in perspective, a housing cover of a latch housing of the door latch of FIG. 6, wherein the housing cover is the carrier for a rotary gripper and a closing spring of the door latch.
Figure 7B:
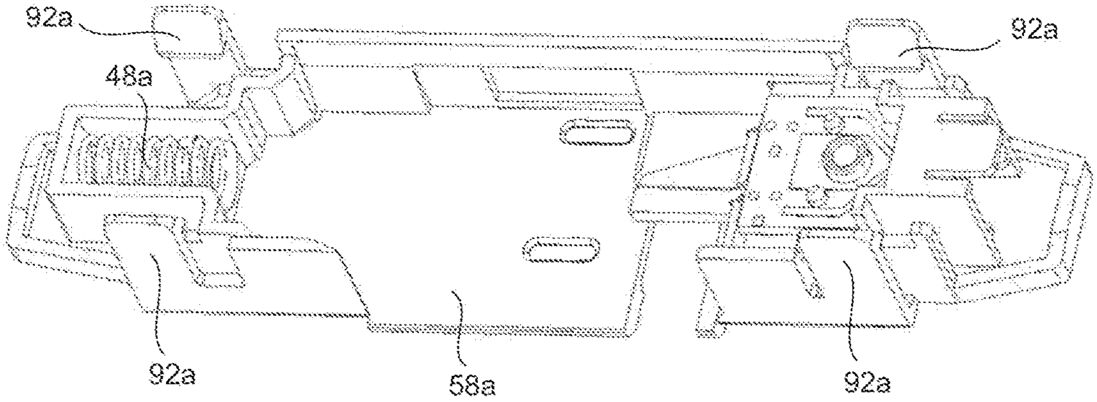
FIG. 7*b* shows, in perspective, a housing main part of the latch housing of the door latch of FIG. 6.

In order nevertheless to make self-healing of the door latch 12 possible, the housing main part 58, together with the gripper 62 and the torsion spring 64, both of which are held and supported on the housing main part 58, are displaceable in the closed position of the rotary gripper 62, as a unit and without mutual relative movement, in the longitudinal direction of the profile strip 24 from the rest position according to FIG. 2 into the yielding position according to FIG. 3*b*. FIGS. 5*a*, 5*b* show such an operation of self-healing. Self-healing becomes necessary if the rotary gripper 62 changes from the open position according to FIG. 4*a* into the closed position according to FIG. 4*c* without the door 20 at the same time being closed. Self-healing means that, in the closed position of the rotary gripper 62, the door 20 can nevertheless be closed and the closing shackle can be brought into proper gripping engagement with the rotary gripper 62. This is possible in that, by suitable shaping of the front side of the front jaw 68, it is ensured that, when the closing shackle 30 meets that jaw front side (see FIG. 5*a*), a force component transverse to the direction of the closing path 78 is generated on the gripper 62. This force urges the totality consisting of the housing main part 58, the torsion spring 64 and the rotary gripper 62 from the rest position according to FIG. 5*a* into the yielding position according to FIG. 5*b*. In the yielding position, the shackle crosspiece 56 is able to move past the front jaw 68 and enter the gripping mouth 66. The return spring 48 effects a return movement of the totality consisting of the housing main part 58, the torsion spring 64 and the rotary gripper 62 into the rest position according to FIG. 5*a*.

Where it has been stated that the totality consisting of the housing main part 58, the torsion spring 64 and the rotary gripper 62 is displaceable without mutual relative movement from the rest position according to FIG. 5*a* into the yielding position according to FIG. 5*b*, this does not mean that no such relative movement must occur in a concrete self-healing operation in which the closing shackle 30 strikes the front jaw 68 of the rotary gripper 62. It is possible that, as a result of the closing shackle 30 striking the front jaw 68 of the rotary gripper 62, the rotary gripper may experience a certain, comparatively slight rotation, which is naturally accompanied by a relative movement of the rotary gripper 62 with respect to the torsion spring 64. However, the torsion spring 64 and the rotary gripper 62 are so arranged on the housing main part 58 that it is in principle possible to displace the housing main part 58 together with the torsion spring 64 and the rotary gripper 62 as a unit without necessarily a mutual relative movement of the components of this unit in the strip longitudinal direction.

Reference will now be made to the exemplary embodiment of FIGS. 6 to 8*c*. In those figures, elements which are the same or have the same effect are provided with the same reference numerals as in the preceding figures, but with the addition of a lowercase letter. Unless indicated otherwise hereinbelow, reference is made to the preceding comments for the explanation of such elements which are the same or have the same effect.

The fundamental difference in the door latch 12*a* of FIGS. 6 to 8*c* compared to the door latch 12 of FIGS. 2 to 5*b* is that, in the door latch 12*a*, the entire latch housing 50*a* including the housing main part 58*a* is not longitudinally displaceable in the profile strip 24*a*. Instead, in the door latch 12*a*, the housing main part 58*a* is fastened in a longitudinally fixed manner to the profile strip 24*a*, and only the housing cover 56*a* is held on the main housing part 58*a* with play for movability in the strip longitudinal direction relative thereto. At the same time, the housing cover 56*a* in the exemplary embodiment of FIGS. 6 to 8*c* serves as the carrier for the torsion spring 64*a* and the rotary gripper 62*a*; the latter two components are thus mounted not, as in the exemplary embodiment of FIGS. 2 to 5*b*, on the housing main part 58*a* but on the housing cover 56*a*.

For fastening the housing main part 58*a* to the profile strip 24*a*, fastening holes 90*a* (FIGS. 6, 8*c*) are provided in the housing main part 58*a*, which fastening holes serve to receive fastening bolts (not shown in detail) by means of which the housing main part 58*a* can be screwed to the profile strip 24*a*. In order to connect the housing main part 58*a* to the housing cover 56*a* in such a manner that it has play for movability but is captive, in the example shown there are provided on the housing main part 58*a* a plurality of resilient clamping hooks 92*a* by means of which the housing cover 56*a* can be clamped to the housing main part 58*a*. The clamping hooks 92*a* define a play path along which the housing cover 56*a* is displaceable in the strip longitudinal direction relative to the housing main part 58*a*. In the latch 12*a*, the return spring 48*a* is supported between the housing main part 58*a* and the housing cover 56*a* (the return spring 48*a* is depicted both in FIG. 7*a* and in FIG. 7*b*; this does not mean that it is present twice, it is simply shown in each of these two figures).

Figure 8A:
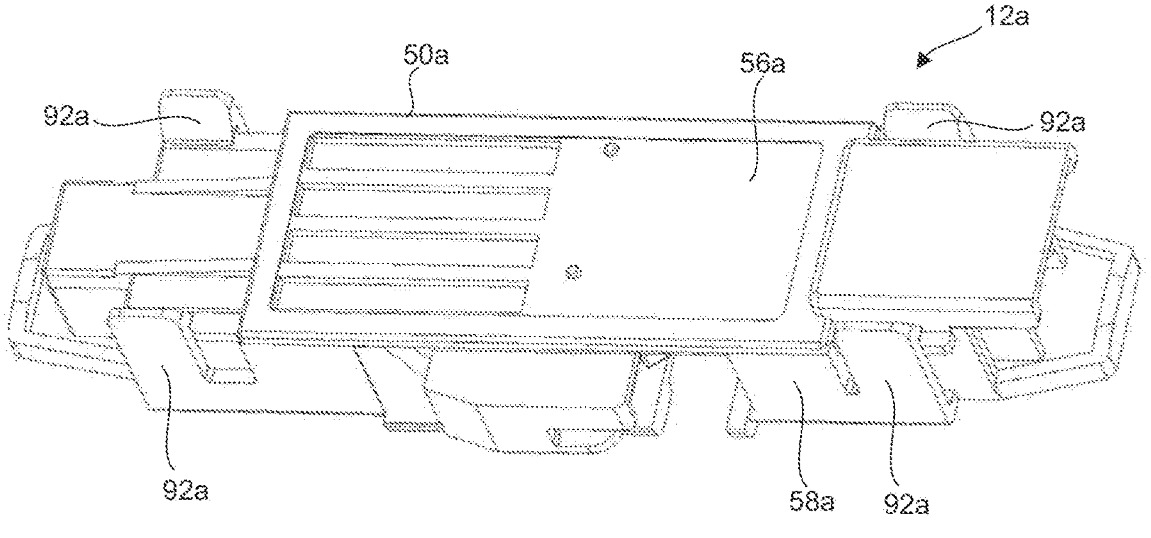
FIG. 8*a* shows, in perspective, the door latch of FIG. 6 in a rest position of the housing cover relative to the housing main part.
Figure 8B:
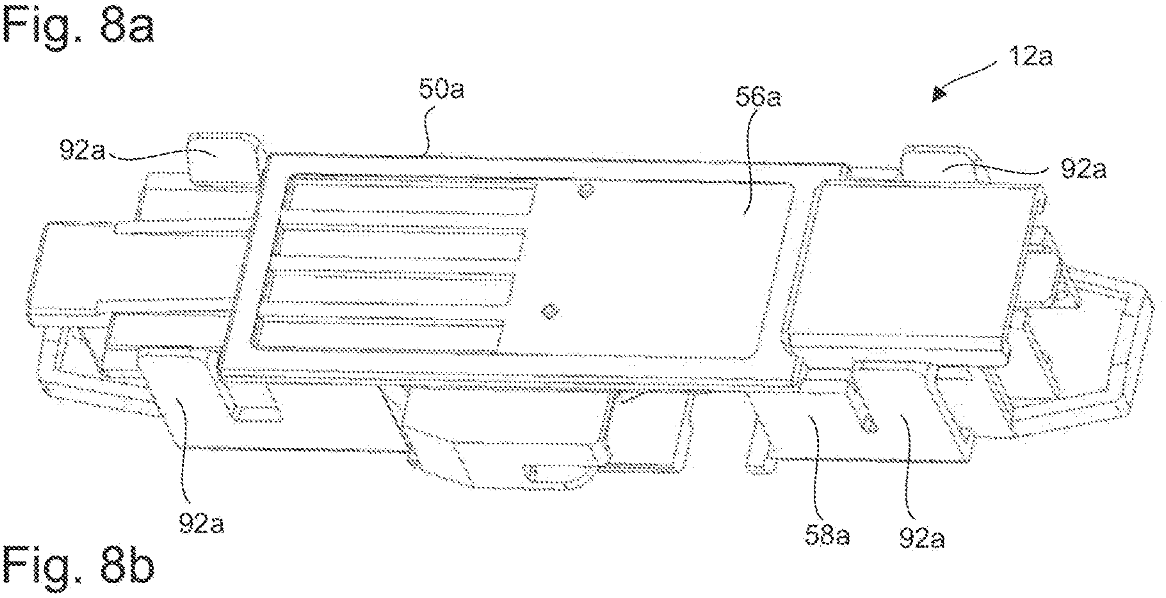
FIG. 8*b* shows a perspective view corresponding to FIG. 8*a* but wherein the housing cover has been displaced into a yielding position relative to the housing main part.
Figure 8C:
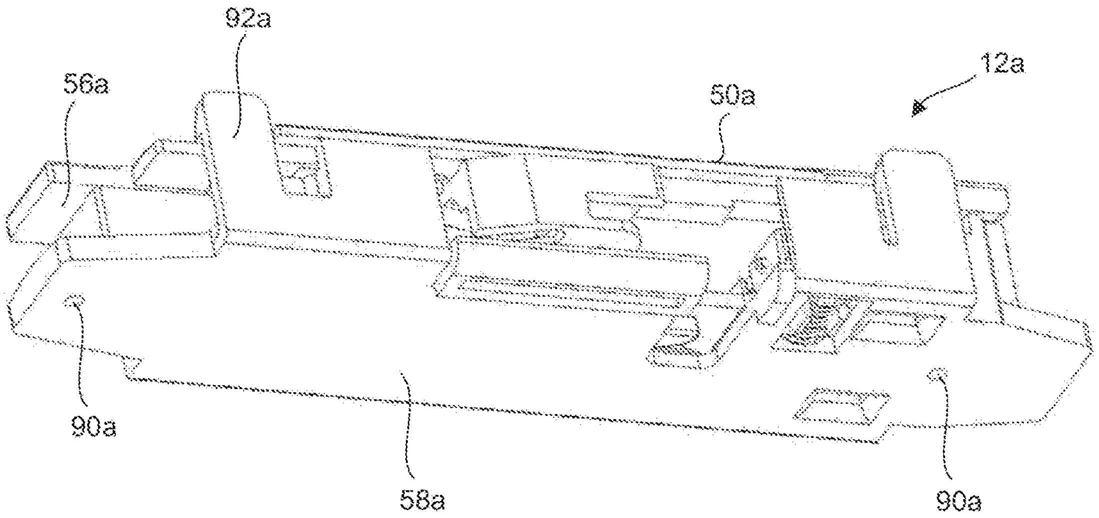
FIG. 8*c* shows the door latch of FIG. 6 in the yielding position of the housing cover corresponding to FIG. 8*b*, but in a different perspective view.

FIG. 8*a* shows the door latch 12*a* in a starting or rest state in which the housing cover 56*a* (together with the components held thereon, including the torsion spring 64*a* and the rotary gripper 62*a*) is urged by the return spring 48*a* into a rest position relative to the housing main part 58*a*. This corresponds to the normal state of the door latch 12*a* during proper opening and closing of the door of the dishwasher. FIG. 8*b*, on the other hand, shows the door latch 12*a* in a yielding state in which the housing cover 56*a* (together with the components held thereon) has been moved relative to the housing main part 58*a* and against the force of the return spring 48*a* into a yielding position. In this yielding position, the front jaw 68*a* of the rotary gripper 62*a* is in a position relative to the closing shackle corresponding to FIG. 5*b*, that is to say, in the yielding position of the housing cover 56*a*, the closing shackle is able to move with its shackle cross-piece past the front jaw 68*a* and enter the gripping mouth 66*a*.

As in the exemplary embodiment of FIGS. 2 to 5*b*, in the case of the door latch 12*a* of FIGS. 6 to 8*c*, the housing cover 56*a* together with the torsion spring 64*a* and the rotary gripper 62*a* as a unit and without necessary mutual relative movement can be displaced in the strip longitudinal direction relative to the profile strip 24*a* in order thereby to permit self-healing of the door latch 12*a*.

What is claimed is:

1. A door latch for a domestic electrical appliance, comprising:

a closing spring assembly, a gripper which is arranged so as to be movable between an open position and a closed position and which, in the open position, is urged by the closing spring assembly into supporting contact with an abutment structure, preventing relaxation of the closing spring assembly, wherein the gripper has a gripping mouth delimited by two jaws for holding captive a closing member which, on closing of the door, approaches the rotary gripper along a closing path, wherein, on closing of the door, the closing member, in the open position of the gripper, strikes a first of the jaws and in so doing initiates a movement of the gripper into the closed position, wherein the movement of the gripper comprises a first part-movement starting from the open position and a subsequent second part-movement into the closed position, wherein the first part-movement comprises a rotational movement of the gripper until the gripper loses supporting contact with the abutment structure, wherein, during the first part-movement, a second of the jaws engages behind the closing member and in so doing captures the closing member in the gripping mouth, wherein the second part-movement comprises a translational movement of the gripper along the closing path with relaxation of the closing spring assembly, wherein in a state in which the gripper is in a closed position without capturing the closing member, the gripper and the abutment structure, in the closed position of the gripper, are arranged for a joint, linear, yielding movement into a yielding position transverse to the closing path in order to allow the door to be closed in the closed position, wherein the second jaw is shaped such that it is ensured that, when the closing member meets that second jaw, a force component transverse to the direction of the closing path is generated on the gripper, and wherein in the yielding position, the closing member is able to move past the second jaw and to enter the gripping mouth, wherein a return spring effects a return movement of said members positioned in the yielding position.

2. The door latch according to claim 1, wherein the closing spring assembly is also arranged for the joint yielding movement with the gripper and the abutment structure.

3. The door latch according to claim 1, wherein the gripper and the abutment structure and if desired also the closing spring assembly are arranged on a common carrier which is movably arranged so as to carry out the yielding movement, and the door latch comprises a return spring, separate from the closing spring assembly, for returning the carrier from the yielding position.

4. The door latch according to claim 3, wherein a latch housing in which the gripper and the closing spring assembly are accommodated, wherein the latch housing comprises a housing main part and a cover part for closing the housing main part, wherein either the carrier is formed by the cover part and the cover part is arranged so as to be movable relative to the housing main part to carry out the yielding movement, or the carrier is formed by the housing main part and the latch housing is intended and configured to be movably arranged relative to a superordinate component in order to carry out the yielding movement.

5. The door latch according to claim 1, wherein the closing spring assembly comprises a torsion spring, which is formed by a spring wire coil with two spring legs protruding tangentially therefrom, wherein the torsion spring is arranged with its coil axis substantially perpendicular to a rotational plane of the gripper, and one of the spring legs is coupled with the gripper.

6. The door latch according to claim 5, wherein, in the closed position of the gripper, when seen perpendicular to the rotational plane thereof, the spring leg coupled with the gripper is oriented substantially perpendicular to the direction of the closing path.

7. The door latch according to claim 1, wherein the gripper is designed with an elongate hole into which a bearing member arranged stationarily relative to the abutment structure engages with play for movability in the hole longitudinal direction, wherein, in the closed position of the gripper, the elongate hole runs with its hole longitudinal direction substantially along the closing path.

8. The door latch according to claim 1, wherein the gripper is arranged so as to be movable within a plane between the open position and the closed position and the yielding movement of the gripper and the abutment structure into the yielding position is within the plane in order to allow the door to be closed in the closed position of the gripper.

9. The door latch according to claim 1, wherein in the state in which the gripper is in the closed position without capturing the closing member the second jaw obstructs movement of the closing member into the gripping mouth, and wherein engagement of the closing member with the second jaw moves the gripper to the yielding position to allow the closing member to enter the gripping mouth.

10. The door latch according to claim 1, wherein the force component generated by the closing member engaging the gripper in the closed position urges the gripper and the abutment structure to move perpendicular to the direction of the closing path.

11. A domestic electrical appliance comprising a dishwasher, comprising a body having a working chamber formed therein, a door for closing the working chamber, which door is pivotably mounted on the body and carries a closing member, and a door latch installed in a body wall including a roof wall of the body, wherein the door latch comprises a closing spring assembly and a gripper which is arranged so as to be movable between an open position and a closed position, wherein the gripper has a gripping mouth delimited by two jaws for holding captive a closing member which, on closing of the door, approaches the rotary gripper along a closing path, wherein, on closing of the door, the closing member, in the open position of the gripper, strikes a first of the jaws and in so doing initiates a movement of the gripper into the closed position, wherein the movement of the gripper from the open position into the closed position comprises a rotational movement of the gripper in which a second of the jaws engages behind the closing member and in so doing captures the closing member in the gripping mouth, wherein the closing spring assembly, in the closed position of the gripper, acts against a return movement of the gripper in the direction towards the open position, wherein the door latch further comprises a latch housing in which the gripper and the closing spring assembly are accommodated, wherein the gripper and the closing spring assembly are arranged on a common carrier which is movably arranged so as to carry out a yielding movement, a linear yielding movement, relative to the body wall, wherein the yielding movement of the carrier comprises a corresponding joint yielding movement of the gripper and of the closing spring assembly transverse to the closing path in order to allow the door to be closed when the gripper is in the closed position, wherein the second jaw is shaped such that it is ensured that, when the closing member meets that second jaw, a force component transverse to the direction of the closing path is generated on the gripper, and wherein in the yielding position, the closing member is able to move past the second jaw and to enter the gripping mouth, wherein a return spring effects a return movement of said members positioned in the yielding position.

12. The domestic electrical appliance according to claim 11, wherein the body comprises in the body wall a profile strip which extends over part of the width of the body wall, substantially over the entire width thereof, and is U-shaped in cross-section, on which profile strip the door latch is mounted.

13. The domestic electrical appliance according to claim 12, wherein the latch housing comprises a housing part, a housing main part, which is designed with mounting structures for mounting on the profile strip, wherein the common carrier for the gripper and the closing spring assembly is formed by the housing part, and wherein the housing part has play for movability in the strip longitudinal direction relative to the profile strip, which ensures the yielding movement.

14. The domestic electrical appliance according to claim 13, wherein there is formed in the profile strip at least one mounting channel in which the housing part is inserted with play for movability in the strip longitudinal direction, wherein there is provided on the profile strip a support structure for a return spring which is supported between the housing part and the profile strip.

15. The domestic electrical appliance according to claim 12, wherein the latch housing comprises a first housing part comprising a housing main part, which is designed with mounting structures for mounting on the profile strip, wherein the latch housing further comprises a second housing part which is formed separately from the first housing part, which serves as the housing cover of the latch housing, wherein the common carrier for the gripper and the closing spring assembly is formed by the second housing part, and wherein the second housing part has play for movability in the strip longitudinal direction relative to the first housing part, which ensures the yielding movement.

16. The domestic electrical appliance according to claim 11, wherein the gripper is installed in the body wall with its plane of rotation parallel to the wall plane of the body wall.

17. The domestic electrical appliance according to claim 11, wherein the gripper is arranged so as to be movable within a plane between the open position and the closed position and the yielding movement of the gripper and the abutment structure into the yielding position is within the plane in order to allow the door to be closed in the closed position of the gripper.

18. The domestic electrical appliance according to claim 11, wherein in the state in which the gripper is in the closed position without capturing the closing member the second jaw obstructs movement of the closing member into the gripping mouth, and wherein engagement of the closing member with the second jaw moves the gripper to the yielding position to allow the closing member to enter the gripping mouth.

19. The domestic electrical appliance according to claim 11, wherein the force component generated by the closing member engaging the gripper in the closed position urges the gripper and the abutment structure to move perpendicular to the direction of the closing path.

* * * * *